United States Patent [19]
Carpenter

[11] Patent Number: 5,833,016
[45] Date of Patent: Nov. 10, 1998

[54] METHOD AND APPARATUS FOR EFFICIENTLY LIFTING AND LOWERING STANDS OF PIPE

[76] Inventor: W. T. Carpenter, 525 S. Flager, 23B, West Palm Beach, Fla. 33401

[21] Appl. No.: 733,902

[22] Filed: Oct. 18, 1996

[51] Int. Cl.⁶ ........................................... E21B 7/00
[52] U.S. Cl. ............................ 175/85; 166/77.5
[58] Field of Search ................. 175/85, 162, 27, 175/45; 166/77.5

[56] References Cited

U.S. PATENT DOCUMENTS

| | | |
|---|---|---|
| 3,521,445 | 7/1970 | Grable . |
| 3,738,455 | 6/1973 | Tintore . |
| 3,899,033 | 8/1975 | Van Huisen . |
| 4,187,546 | 2/1980 | Heffernan et al. ............ 175/52 X |
| 4,209,990 | 7/1980 | Shelton, Jr. . |
| 4,286,902 | 9/1981 | Clay . |
| 4,334,217 | 6/1982 | Nield et al. ................. 175/45 X |
| 4,403,655 | 9/1983 | Trout ......................... 175/27 X |

Primary Examiner—William P. Neuder
Attorney, Agent, or Firm—Fulbright & Jaworski

[57] ABSTRACT

A method and apparatus for lifting and lowering pipe, including means for storing energy during the lowering of a first pipe and means for releasing the stored energy during the lifting of a second pipe.

17 Claims, 3 Drawing Sheets

METHOD AND APPARATUS FOR EFFICIENTLY LIFTING AND LOWERING STANDS OF PIPE

BACKGROUND OF THE INVENTION

This invention is in the field of drilling wells.

In the drilling of wells, particularly oil wells, pipe is continually raised and lowered by cables mounted on derricks. The pipe may be lifted singly to be introduced for the first time into the wellbore, or may be removed singly from the wellbore. The pipe may be connected in stands and lifted from a rack of stands during, for example, a tripping operation. The pipe may be lowered either gradually, as during drilling, or may be lowered quickly during, for example, a tripping operation.

A deficiency in the raising and lowering of pipe in the operation of drilling of wells is the high energy requirement of such activity. Typically, a high horsepower engine is used to lift the pipe, and a brake is required to slow the lowering of pipe to avoid damage. In effect, energy from the engine is converted indirectly to waste heat by the brake.

SUMMARY OF THE INVENTION

It is an object of the present invention to increase the efficiency of the raising and lowering of stands of pipe during the drilling of wells.

It is a further object of the present invention to reduce the horsepower requirement of engines used to drive drums that spool the cable that raises and lowers stands of pipe during the drilling of wells.

It is a further object of the present invention to reduce or to eliminate the braking requirements of the drums that spool the cable that raises and lowers stands of pipe during the drilling of wells.

To achieve the foregoing objects, there is disclosed an apparatus for raising and lowering pipe comprising a derrick; a cable mounted onto the derrick; a drum for extending and retrieving the cable; a motor for driving the drum; energy storage means; means for converting kinetic energy from the drum to potential energy in the energy storage means; and means for converting potential energy from the energy storage means to kinetic energy in the drum. The energy storage means may be an accumulator. The energy storage means may be a spring. The energy storage means may be a battery.

The means for converting kinetic energy from the drum to potential energy in the energy storage means, and the means for converting potential energy in the energy storage means to kinetic energy in the drum, may comprise a reversible motor drive, a piston-actuated drive, or a lead screw actuated drive.

The apparatus may further comprise means for alternatingly engaging the means for converting kinetic energy from the drum to potential energy in the energy storage means and the means for converting potential energy in the energy storage means to kinetic energy in the drum.

There is also disclosed a method of efficiently lifting and lowering pipe in a drilling operation comprising the steps of lowering a first pipe from a derrick; storing the energy released by the lowering of the first pipe; lifting a second pipe; and using the stored energy to assist in the lifting of the second pipe.

DETAILED DESCRIPTION OF THE INVENTION AND PREFERRED EMBODIMENT

FIGS. 1–5 depict various embodiments of the claimed invention. Throughout the figures, like parts are assigned like numbers.

Figure 1:
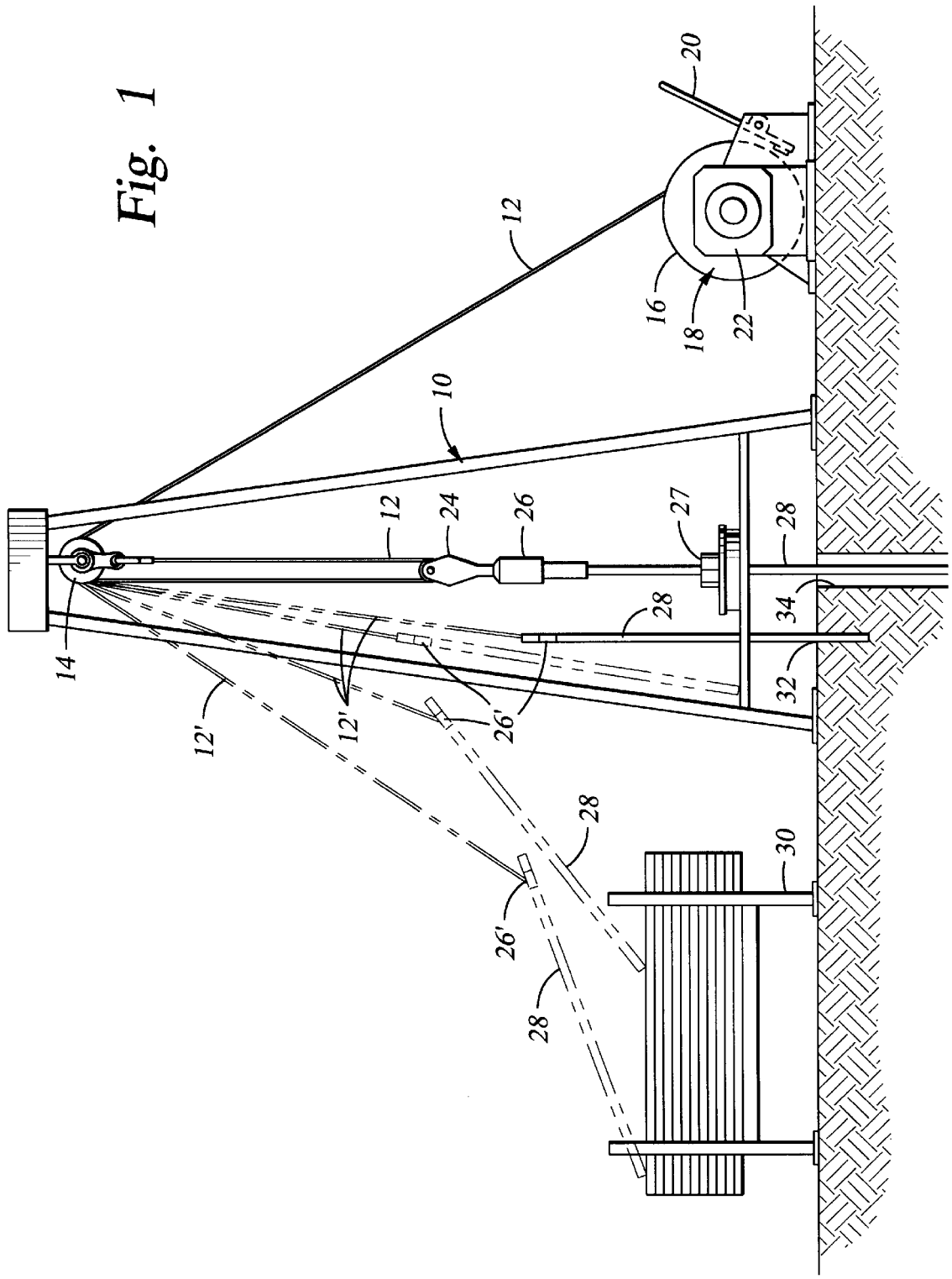
FIG. 1 is a side view of a typical drilling apparatus employing the claimed invention.

FIG. 1 depicts apparatus used during the drilling of a well. To derrick 10 there is attached a cable 12. Crown block 14 leads the cable to the top of derrick 10. The cable 12 is extendably and retrievably spooled around drum 16 of draw works 18. Drum brake 20 serves to brake drum 16 as necessary to safely or to desirably extend the cable 12 from the drum 16. Engine 22 serves to rotate drum 16 as desired to retrieve cable 12.

Cable 12 may extend from crown block 14 and be reeved through traveling block 24. Traveling assembly 26 is affixed to traveling block 24. Traveling assembly 26 may include several tools known to those skilled in the art, including drilling hooks, bails, and elevators. Using traveling assembly 26, pipe 28 may be lifted to or from stack 30, to or from mouse hole 32, and to or from well bore 34. Traveling assembly 26 may be used with the cable 12 in a multiple purchase arrangement, or may be used in a single purchase arrangement has illustrated by cable 12' and traveling assembly 26'. Kelly 27 connects and imparts rotation to pipe 28 placed into wellbore 34.

Figure 2:
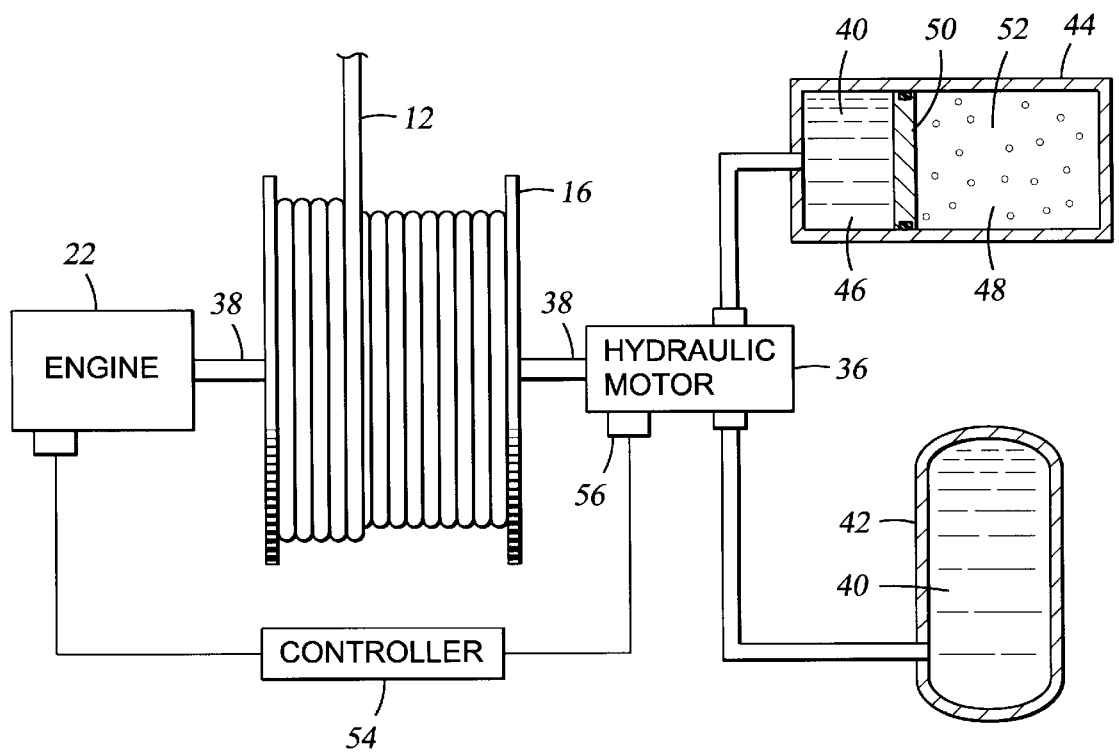
FIG. 2 is a top view of a preferred embodiment of the claimed invention.

FIG. 2 depicts a top-view of a preferred embodiment of the claimed invention. Reversible hydraulic motor 36 is attached to the axis 38 of drum 16. As drum 16 extends cable 12, hydraulic motor 36 may be engaged by the axis 38 of drum 16 to pump hydraulic fluid 40 from hydraulic fluid reservoir 42 into accumulator 44. The accumulator 44 may comprise a hydraulic cylinder section 46 and a gas cylinder section 48. As the volume of hydraulic fluid 40 increases in hydraulic cylinder section 46, a piston 50 may be incorporated to compress the gas 52 in gas cylinder section 48, thus storing potential energy in the accumulator 44.

As the drum 16 retrieves the cable 12, the normally required power of engine 22 may be reduced or replaced by reversing the hydraulic motor 36. With hydraulic motor 36 reversed, the compressed gas 52 will expand, converting its potential energy to kinetic energy and driving hydraulic fluid 40 into hydraulic fluid section 46 through hydraulic motor 36, thus assisting or replacing power from engine 22.

A controller 54 may automatically detect torque exerted by the. axis 38 on, for example, engine 22. The controller 54 may automatically engage, disengage, or reverse the hydraulic motor 36 with transmission 56 in accordance with a protocol established by one skilled in the art. In the alternative, such engaging disengaging, or reversing be done manually or with valves.

Figure 3:
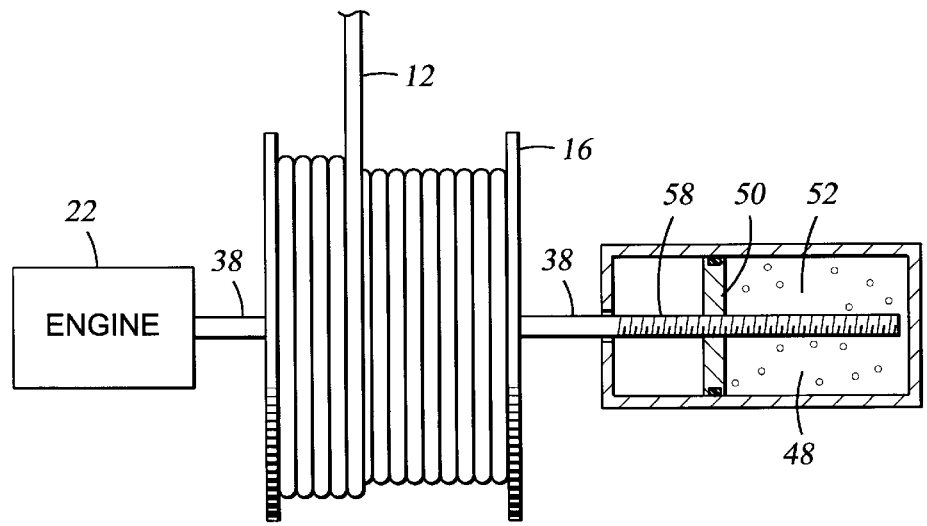
FIG. 3 is a top view of an alternative embodiment of the claimed invention.

FIG. 3 depicts a top view of an alternative embodiment of the claimed invention. Axis 38 works directly on lead screw 58 to compress gas 52 in a gas cylinder section 48. The apparatus depicted in FIG. 3 may be automated as illustrated in FIG. 2.

Figure 4:
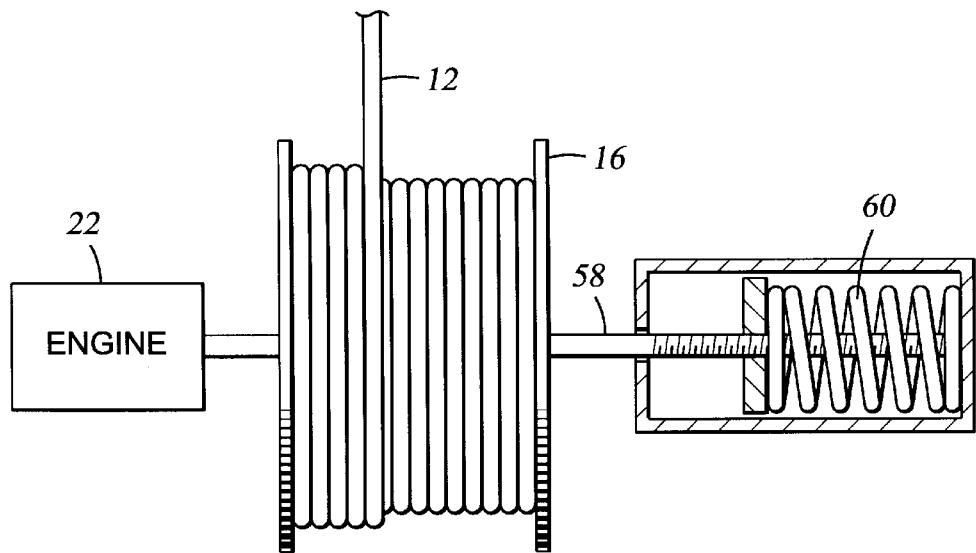
FIG. 4 is a top view of an alternative embodiment of the claimed invention.

FIG. 4 depicts a top view of an alternative embodiment of the claimed invention. Axis 38 works directly on lead screw 58 to compress a spring 60. The apparatus depicted in FIG. 4 may be automated as depicted in FIG. 2.

Figure 5:
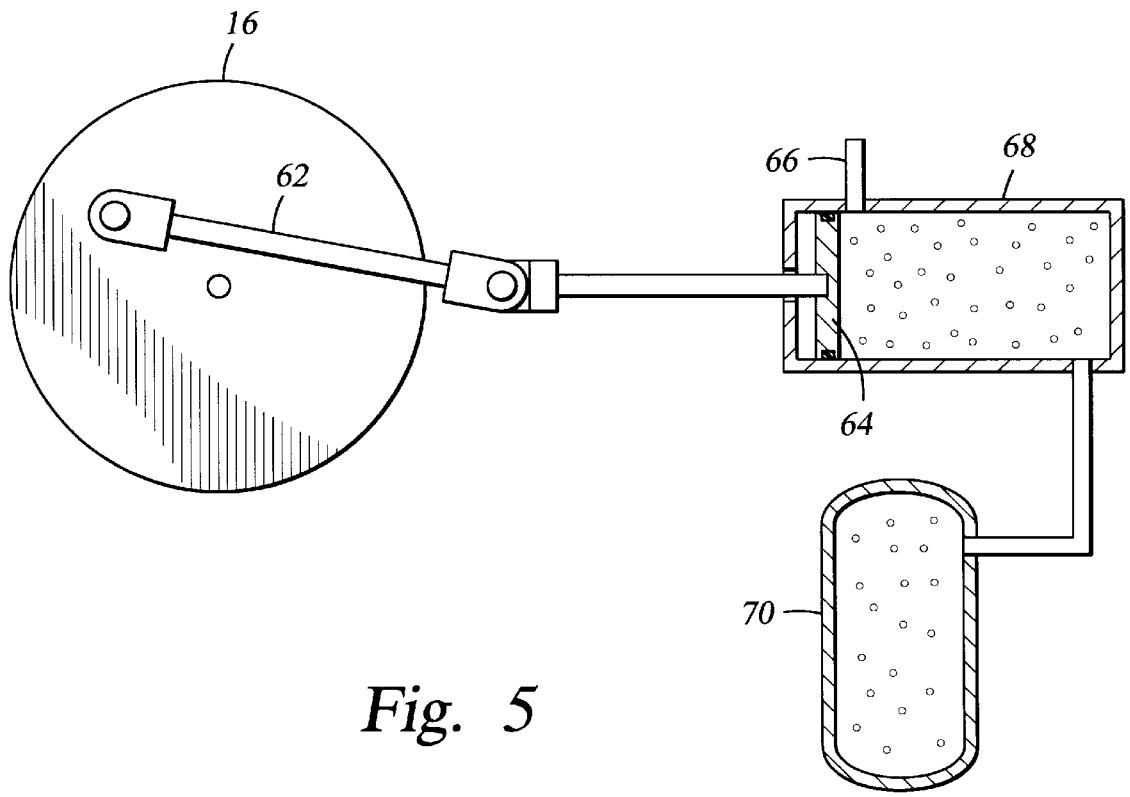
FIG. 5 is a side view of an alternative embodiment of the claimed invention.

FIG. 5 depicts a side view of an alternative embodiment of the claimed invention. Rod 62 is attached to the periphery of drum 16. As drum 16 turns, rod 62 operates piston 64 to pump a gas from intake 66, through cylinder 68, into tank 70. The process may be reversed such that gas from tank 70 may enter cylinder 68 to drive piston 64 and rod 62, assisting or replacing power from the engine 22 to rotate drum 16 such that cable 12 is retrieved. A control means, such as the one illustrated in FIG. 2, may be employed to control the apparatus depicted in FIG. 5.

It will be readily apparent to those skilled in the art that many variations of the invention may be employed without deviating from the scope of the claims. For example, any reversible energy storage means may be employed in the invention, including, without limitation, counterweights, springs, batteries, and accumulators. The accumulators may be any type known to those skilled in the art, including, without limitation, gas accumulators. The hydraulic fluid may be any suitable type, such as oil, water, or a mixture thereof. A hydromatic or electric brake may be utilized to capture energy. The piston-actuated drive may be employed to pump air, water, or oil. The energy storage and releasing means may be engaged permanently, manually, or automatically. If the energy storage and releasing means is automated, any control mechanism apparent to those skilled in the art may be used. Many configurations of the invention within the scope of the claims, but not illustrated in the drawings, will be readily apparent to those skilled in the art having the benefit of this disclosure.

I claim:

1. An apparatus for raising and lowering stands of pipe comprising:
   a derrick;
   a cable mounted onto the derrick;
   a drum for extending and retrieving the cable;
   a motor for driving the drum;
   energy storage means;
   means for converting kinetic energy from the drum to potential energy in the energy storage means; and
   means for converting potential energy from the energy storage means to kinetic energy in the drum.

2. The apparatus of claim 1 in which the energy storage means is an accumulator.

3. The apparatus of claim 1 in which the energy storage means is a spring.

4. The apparatus of claim 1 in which the energy storage means is a battery.

5. The apparatus of claim 1 in which the means for converting kinetic energy from the drum to potential energy in the energy storage means, and the means for converting potential energy in the energy storage means to kinetic energy in the drum, comprises a reversible motor drive.

6. The apparatus of claim 1 in which the means for converting kinetic energy from the drum to potential energy in the energy storage means, and the means for converting potential energy in the energy storage means to kinetic energy in the drum, comprises a reversible lead screw actuated drive.

7. The apparatus of claim 1 in which the means for converting kinetic energy from the drum to potential energy in the energy storage means, and the means for converting potential energy in the energy storage means to kinetic energy in the drum, comprises a reversible piston-actuated drive.

8. The apparatus of claim 1 further comprising means for alternatingly engaging the means for converting kinetic energy from the drum to potential energy in the energy storage means and means for converting potential energy in the energy storage means to kinetic energy in the drum.

9. The apparatus of claim 2 in which the means for converting kinetic energy from the drum to potential energy in the accumulator, and for converting potential energy in the accumulator to kinetic energy in the drum, comprises a reversible motor drive.

10. The apparatus of claim 2 in which the means for converting kinetic energy from the drum to potential energy in the accumulator, and for converting potential energy in the accumulator to kinetic energy in the drum, comprises a reversible piston actuated drive.

11. The apparatus of claim 2 in which the means for converting kinetic energy from the drum to potential energy in the accumulator, and for converting potential energy in the accumulator to kinetic energy in the drum, comprises a reversible lead screw drive.

12. The apparatus of claim 2 further comprising means for alternatingly engaging the means for converting kinetic energy from the drum to potential energy in the energy storage means and means for converting potential energy in the energy storage means to kinetic energy in the drum.

13. The apparatus of claim 3 in which the means for converting kinetic energy from the drum to potential energy in the energy storage means, and the means for converting potential energy in the energy storage means to kinetic energy in the drum, comprises a reversible, lead screw actuated drive.

14. The apparatus of claim 3 further comprising means for alternatingly engaging the means for converting kinetic energy from the drum to potential energy in the energy storage means and means for converting potential energy in the energy storage means to kinetic energy in the drum.

15. The apparatus of claim 4 in which the means for converting kinetic energy from the drum to potential energy in the energy storage means, and the means for converting potential energy in the energy storage means to kinetic energy in the drum, comprises a reversible motor drive.

16. The apparatus of claim 4 further comprising means for alternatingly engaging the means for converting kinetic energy from the drum to potential energy in the energy storage means and means for converting potential energy in the energy storage means to kinetic energy in the drum.

17. A method of efficiently lifting and lowering pipe in a drilling operation comprising the steps of:
   lowering a first pipe from a derrick;
   storing the energy released by the lowering of the first pipe;
   lifting a second pipe; and
   using the stored energy to assist in the lifting of the second pipe.

* * * * *